United States Patent [19]
Wheatley et al.

[11] 4,064,366
[45] Dec. 20, 1977

[54] INTRINSICALLY SAFE TELEPHONE SYSTEMS

[75] Inventors: William Wheatley, Barton-on-Sea; Robert Roy Goff, Brockenhurst; William Charles Wheatley, Beeston, all of England

[73] Assignee: Winster Engineering Group Limited, England

[21] Appl. No.: 649,364

[22] Filed: Jan. 15, 1976

[51] Int. Cl.² .................................................. H04M 1/18
[52] U.S. Cl. ................................ 179/2 R; 179/2 BC; 79/81 R
[58] Field of Search ............. 179/1 H, 1 R, 2 R, 2 A, 179/2 BC, 81 R, 28, 37, 40, 81 B

[56] References Cited

U.S. PATENT DOCUMENTS 3,909,547  9/1975  Day ........................................ 179/40

FOREIGN PATENT DOCUMENTS

| 1,041,329 | 9/1966 | United Kingdom ............... 179/81 B |
| 917,509 | 2/1963 | United Kingdom ............... 179/81 B |
| 1,370,956 | 10/1974 | United Kingdom ............... 179/2 BC |
| 1,350,015 | 4/1974 | United Kingdom ............... 179/2 BC |
| 906,182 | 9/1962 | United Kingdom ............... 179/81 R |
| 928,091 | 6/1963 | United Kingdom ............... 179/81 B |

Primary Examiner—Kathleen H. Claffy
Assistant Examiner—Joseph A. Popek
Attorney, Agent, or Firm—Ostrolenk, Faber, Gerb & Soffen

[57] ABSTRACT

An intrinsically safe telephone system for use in mines or similar hazardous areas including a battery charging circuit arranged to supply charging current of a predetermined low value to the battery of an operational unit located in the hazardous area during on-hook periods. A circuit is provided for modulating the charging current below the predetermined value to generate both the incoming and outgoing call signals during signaling periods.

14 Claims, 6 Drawing Figures

INTRINSICALLY SAFE TELEPHONE SYSTEMS

BACKGROUND OF THE INVENTION

This invention relates to telephone systems. The invention has been developed primarily in relation to the requirements which arise in respect of a telephone system in which certain of the stations to and from which calls require to be made are situated in a hazardous area, that is to say an area in which the gaseous environment is of a composition such that there is a risk of ignition, as, for example, occurs in underground mine workings.

It will, however, be understood that the invention is of general application in environments in which like or analogous requirements arise.

In underground mine workings, and more especially those in which mining operations are conducted by what is known as long wall mining method, the coal or other mineral to be extracted is removed from a long face. At one end there is an inlet tunnel or roadway leading up to the face along which incoming supplies are brought and at a position spaced along the coal face, an outlet roadway or tunnel leads away from the coal face, the mined coal or mineral material normally being conveyed away along the outlet roadway.

The area which extends along the face and for some distance along both inlet roadway and outlet roadway and along a main roadway leading, possibly as far as the bottom of the mine shaft, is usually designated a hazardous area, and it is necessary that all electrical equipment installed and operating in such area shall comply with a safe specification. The regulations made by Governmental agencies vary from one country to another but it is convenient to refer to those which govern the use of electrical equipment in underground mine workings in Great Britain where, generally speaking, electrical equipment has to comply with one of two requirements, namely either that it shall be in accordance with an "intrinsically safe specification" or shall be contained within a flameproof casing, the term "flameproof" being defined in more detail in British Standards relative to the particular equipment and conditions under which it is used.

Intrinsically safe specifications in Great Britain are determined upon the basis of current and voltage values across a spark gap which will not produce ignition in the atmosphere under consideration. As a guide to designers, the current and voltage values have been made available by way of a graph containing a family of curves, one for each atmosphere, with voltage values plotted as abssissae and current values plotted as ordinates. The general form of such curves is that each slopes downwardly from a point near the Y-axis at a decreasing gradient (negative), approaching X-axis more or less asymptotically. A designer can thus select an appropriate voltage (or current) dependent upon the nature of the circuit to be designed, and from the curve applicable to the particular atmosphere for which the circuit is required to be intrinsically safe, the designer can then select the current (or voltage). The circuit requires to be designed so that under the worst fault conditions (for example a short circuit), this current will not be exceeded. Particular circuit configurations still require to be passed as intrinsically safe by the authorities since some departure from the curves of the guidance graph may be required (or permitted) because of variation in circuit parameters (more particularly inductive impedance presented at the possible short circuit point).

The curves of the guidance graph provided by the authority pursuant to British Standard BS1259 of 1958 are classified as pertaining to the operation in the following atmospheres:

Class 1 — methane
Class 2 — pentane
Class 2d — ethylene
Class 2e — hydrogen.

A further factor which affects the readiness with which the gas may become ignited is the particular identity of the metal present in the conductors and components of the electrical circuit intended for use in the hazardous areas.

Certain metals which are commonly used in electrical conductors and components do increase the possibility of ignition of the gas concerned, and their presence then demands a higher standard of the intrinsically safe specification than would be the case where in a given atmosphere were such metal absent.

One of the metals concerned is cadmium which if present at the boundaries of the spark gap, whether produced by breakage or disconnection of the conductor or otherwise, tends to prolong and increase temperature of the spark produced.

In the art there has thus arisen the use of an expression "cadmium safe", as qualifying an intrinsically safe circuit. This means not that the circuit necessarily contains cadmium, but that it complies with a higher standard of intrinsically safe specification for use in a given atmosphere than would be called for upon the basis of that atmosphere alone.

Reverting to the problem of telephone systems in hazardous areas, and in particular in underground mine workings, one of the basic problems which is encountered is that, in order to make an outgoing call, that is to say from some site in the hazardous area by means of a telephone unit situated thereat, to a remote station, such, for example, as a telephone exchange on the surface, it is necessary that the D.C. loop be completed in the exchange in order to produce response of the exchange to an incoming call signal from the telephone unit. Such call signal normally consists of an initial signal (which is simple completion of the D.C. loop) followed by a series of D.C. pulses produced by operation of a dialling means provided at the telephone unit. Further, in order to make an incoming call, some form of call indicating device has to be energised to alert the user to the incidence of the incoming call. In a conventional telephone unit such indicating device is in the form of an electrically operated bell.

If the exchange were connected by a simple transmission line extending down the mine shaft and along the main roadway as necessary, to a site in the inlet roadway or at the coal face, the current value which would be established in conductors of the transmission line to the telephone unit, if conventionally constructed, during initiation of either an outgoing or incoming call would exceed the intrinsically safe value of current. For outgoing calls the current in the D.C. loop would exceed the intrinsically safe value, while for incoming calls the "ringing tone" current for operating the call indicating device would exceed the intrinsically safe value.

SUMMARY OF THE INVENTION

According to one aspect, the present invention resides in the provision of a telephone system suitable for use in effecting communication between a hazardous area and a remote station such as an external exchange, the telephone system comprising one or more operational units for siting in a hazardous area and each including audio electrical transducer means for producing audio output from an incoming electrical signal and an outgoing electrical signal from audio input, amplifier means associated with the transducer means for amplifying at least some of the electrical signals passing thereto or therefrom, a re-chargeable battery for supplying power to the amplifier means, transmission line means for conveying speech signals between the or each operational unit and a remote station, such as the external exchange, an electrical charging circuit arranged to supply charging current of a predetermined low value to the battery of the, or each, operational unit along said transmission line means maintained during times when such operational unit is out of use for speech transmission, means for modulating the charging current to convey call signals between the operational unit or each of same and the remote station.

In a preferred arrangement according to the invention the incoming and outgoing electrical signal to and from the transducer means, and the modulated current of predetermined low value which conveys the call signals, are established along a pair of conductors in the transmission line means common to both these currents.

The employment of a rechargeable battery for supplying electrical current to the amplifier means enables the level of sound reproduction at the transducer means, and the magnitude of the outgoing electrical signal produced by an audio signal at the transducer means of the operational unit to be established at a sufficiently high value to ensure that the telephone unit can be put to effective use, even under adverse working conditions which frequently occur in underground mine workings.

The transducer means, such as a loudspeaker, may be, and preferably is, used to reproduce an audible call signal (e.g. a ringing tone) to perform the function of the conventional bell or call indicating device. Since it derives power from the rechargeable battery for this purpose the need to transmit an electrical current exceeding said predetermined low value along a transmission line means is avoided.

The amplifier means may be encapsulated or otherwise enclosed to allow internal currents in the amplifier means to exceed said predetermined low value, such currents being drawn from the battery and being of relatively short term duration. On the other hand, the continuous, or long term, charging current supplied to the battery is maintained no higher than said predetermined low value and, therefore, the conveyance of this current from the charging circuit to the battery can take place along means which are not encapsulated or enclosed.

In a first arrangement, the charging circuit may be situated at a position near the remote end of the transmission line means (that is to say the end nearest the remote station, such as the surface when the system is installed in an underground mine working), the current being conveyed along the conductors of the line to the operational unit for charging the battery thereof, and, when required, undergoing modulation to convey a call signal along said conductors.

As a possible alternative the charging current may be supplied otherwise than through the transmission line means and in that case a separate current of predetermined low value would be passed through the transmission means and modulated to provide the required call signal.

A preferred manner of modulating said current of predetermined low value (whether this be the charging current or a current of predetermined low value supplied from some separate source specifically to provide a call signal) is that it may be interrupted to produce an initial call signal, and thereafter alternately established and interrupted to produce a series of pulses by operation of a dialling means on, or associated with, the operational unit concerned.

At the remote station a conversion means may be provided for converting the modulated current of said predetermined low value into a call signal current suitable for operating a conventional external exchange. This conversion means may comprise a detector means connected to the transmission line means at the remote end of the latter, and switch contacts operated from one position to another position in response to the condition of the detector means corresponding respectively to current established and current interrupted conditions.

Feeding of the electrical signals to the transducer means along the conductors of the transmission line means may be effected through the intermediary of a transformer coupling device situated at the remote end of the transmission line means, having a primary winding connected, or adapted for connection, to the external exchange, and a secondary winding connected, or adapted for connection, to the conductors of the transmission line means. The detector means may be connected to the secondary winding, and the contact means which are operated in response to the operation of the detector means, may be connected to the primary winding in such a manner as alternatively to complete or interrupt a D.C. loop, through the external exchange.

A further feature is that means may be provided for cutting off the supply of charging current to the battery of the associated operational unit in response to initiation of a call signal.

In the foregoing description of the invention the term "predetermined low value" is to be deemed to be the maximum value which will comply with a safe specification as determined by the regulations in force for the time being governing the use of electrical equipment in the hazardous area in which the telephone system is used or designed for use. By way of example only, and in the following description, the current values set forth comply with intrinsically safe specifications currently in use in underground mine workings in Great Britain but appropriate modifications to these values may, of course, be made to bring the embodiments of telephone system constructed in accordance with the invention into compliance with safe specifications adopted for use in other countries.

BRIEF DESCRIPTION OF THE DRAWINGS

The invention will now be described, by way of example, with reference to the accompanying drawings wherein.

DESCRIPTION OF THE PREFERRED EMBODIMENT

Figure 2:
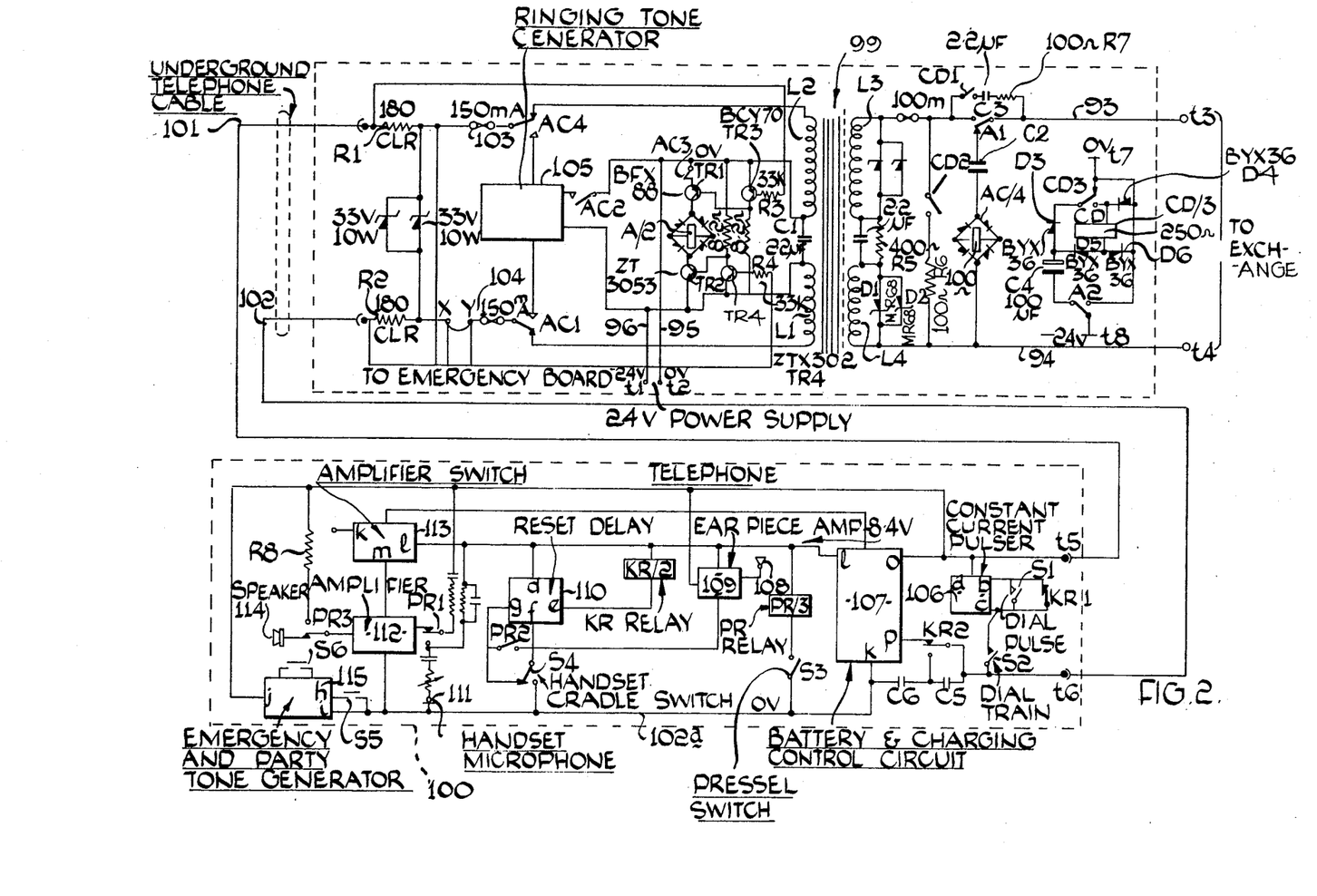
FIG. 2 is a circuit diagram (mainly schematic) of one form of telephone system in accordance with the invention.

Connection points from the individual circuits of FIGS. 3 to 6 to other parts of the circuit shown schematically in FIG. 2 are designated by references $a$ to $p$ which are also shown in FIG. 2.

Figure 1:
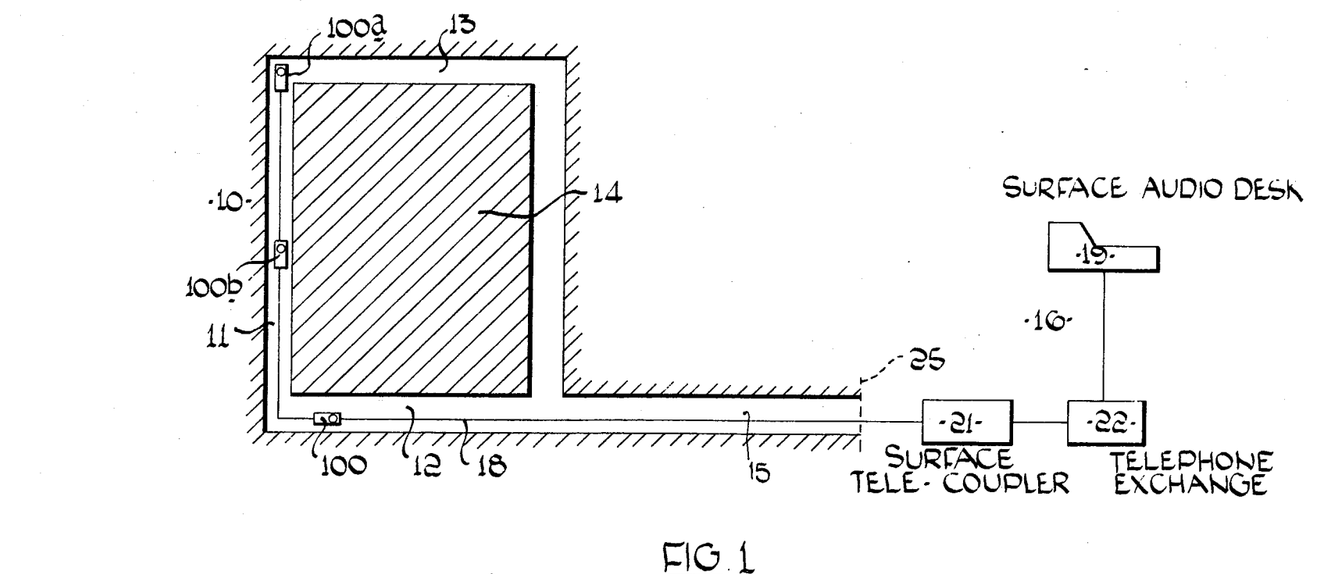
FIG. 1 is a schematic circuit diagram of the telephone system installed in an underground mine working shown in plan.

As shown in FIG. 1 the hazardous area is an underground mine working such as a coal mine in which the coal face is indicated at 10, the coal face area extending along the coal face at 11, and the inlet and outlet tunnels or roadways at 12 and 13. The area 14 contains a stowed material, or, in some cases in this area, the roof of the mine working will have been allowed to cave fully onto the floor of the mine working.

The inlet roadway 12 is shown as extended by a main tunnel or roadway 15 to the lower end of the mine shaft at the upper end of which is a station 16.

Generally all the areas shown in FIG. 1 to the left of the broken line 25 (representing the mine shaft) are considered to be hazardous areas, whereas the surface areas to the right of 25 are non-hazardous.

A telephone unit 100 forming part of the telephone system in accordance with the present invention and connected by a transmission line 18 extending along the inlet roadway 12 and thence along the main roadway 15 and up the mine shaft 25 into the safe surface area 16. Other operational telephone units 100a, 100b are connected to form a party line system with respect to incoming and outgoing calls.

In the safe surface area there is provided a telephone exchange 22 connected to telephone units at the surface and possibly to an audio desk 19 and via a coupler unit 21 to line 18.

The system of FIG. 1 relies upon the establishment of current at an intrinsically safe value along the transmission line 18, and the modulation, e.g. interruption of this current to constitute a call signal enabling an outgoing call to be made on the operational telephone unit such as 100 to the remote station and thence to the telephone exchange, without violating the particular intrinsically safe specification which the system is required to meet.

The intrinsically safe specification may vary according to the conditions prevailing in the hazardous area.

By way of example, however, the following table sets out typical values of voltage, maximum working current, and maximum short circuit current for different classes of hazardous area.

| Class of hazardous area (and gas) | Voltage | Maximum working current | Maximum short circuit current |
| --- | --- | --- | --- |
| 1 Methane | 13.5 max. | 450 milliamperes | 900 milliamperes |
| 2c Pentane | 13.5 max. | 375 milliamperes | 750 milliamperes |
| 2d Ethylene | 13.5 max. | 270 milliamperes | 540 milliamperes |
| 2e Hydrogen | 13.5 max. | 85 milliamperes | 170 milliamperes |

Referring now specifically to the system in FIG. 1 and illustrated in detail in FIGS. 2 to 6, the system comprises an operational telephone unit 100 including audio electrical transducer means, namely a loudspeaker 114, which may be duplicated for reliability, an ear piece 108 and a microphone 111.

An amplifier 112 associated with the microphone 111 amplifies outgoing electrical signals provided therefrom, and also serves to amplify incoming electrical signals fed to the loudspeaker 114. In its normal state the amplifier 112 is connected as a receiving amplifier so that incoming signals such as ringing tone and emergency signals are broadcast over the speaker 114. When the press switch S3 (shown in FIG. 2 in its unoperated position), and which is located on the handset of the telephone, is operated, the microphone 111 is then switched to the input of the amplifier 112 through energisation of relay PR/3 and change-over of contacts PR1. The output of the amplifier 112 is switched by contacts PR3 onto the transmission conductors 101, 102 via a resistor R8 selected to provide a sufficiently low output impedance whilst imposing a relatively high input impedance for incoming signals.

The operational telephone 100 has a rechargeable battery and charging control circuit designated as a unit 107. The battery supplies power to the amplifier 112 and the ear piece amplifier 109. The charging current for this battery is derived from a charging supply circuit connected to terminals $t1$, $t2$ of coupler unit 21. The latter is connected via conductors 101, 102 to terminals $t5$ and $t6$ of the operational unit 100. The charging supply circuit may be designed to supply a plurality of operational telephone units such as that now described. The feed to each such unit would, however, include series resistors such as R1 and R2 limiting the current to an intrinsically safe value in each system, e.g. such resistors may be series connected in the conductors 95, 96 leading from terminals $t1$ and $t2$.

The resistors would be non-inductive and would have a value selected to ensure that in the event of the worst fault condition, the current is limited to a value not exceeding that shown in the right-hand column of the table previously set forth for the intrinsically safe specification with which the apparatus is to comply. In a system where a multicore cable incorporates a plurality of pairs of conductors such as 101, 102 with each pair feeding a respective operational telephone unit 11, it is necessary to allow for possible short circuiting of all the pairs of conductors in selecting the value for the series resistors in conductors 95, 96.

It will, of course, be understood that although intended for operation in a methane atmosphere, it may, alternatively, be designed to comply with a more severe intrinsically safe specification, for example one designated "cadmium safe" in accordance with the usage previously referred to.

The system further includes a tone generator 105 which can be used in the AC circuit or loop established through the transmission line conductors 101 and 102 and through control means constituted by the relay AC/4 and its contacts AC1 and AC4.

The tone generator of this embodiment may be a single stage Colpitts oscillator which produces a near sinusoidal wave form at approximately 1 KHz. To give the device a low output impedance, a current amplifier may be connected to the output of the oscillator. The output from the amplifier is fed onto the conductors by series isolating capacitors (not shown but in the unit 105).

The operational telephone unit further includes a dialling means comprising a dialling train switch S2 which is normally open and closes whenever a conventional rotary finger-operated dial is moved from its datum or unoperated position. In moving back to its datum position under spring loading the dial produces opening and closing of dial pulse switch S1 a number of times depending upon the angular displacement of the dial from its datum position. This in turn produces operation of the constant current pulser 106 which can then feed output constant current pulses onto conductors 101, 102.

The operational telephone unit 100 is connected by way of the conductors 101 and 102 of the transmission line to a transformer coupler device 99 at the remote end of the transmission line (and which typically would be situated at the remote station 16).

As will be noted, this coupler device includes a secondary winding having winding sections L1, L2 which are connected in series with each other and with the conductors 101, 102 through relay contacts AC1 and AC4 and resistors R1 and R2 to form an alternating current circuit or loop to the amplifier 112 of the operational telephone unit.

The coupler device 99 further includes a primary winding having sections L3, L4 connected through the intermediary of relay contacts A1 in series to conductors 93, 94, which in turn are connected at terminals t3, t4 to a conventional exchange installation.

The system further includes a conversion means for converting call signals of a particular character, hereinafter described, originating in the operational telephone unit 100 to generate signals of a form suitable for reception at, and for operating, the various instrumentalities incorporated in the conventional exchange installation, so that these will respond in the same manner as they normally do to signals emanating from conventional surface telephone units in a safe area. This conversion means comprises a detector in the form of two transistors TR3 and TR4 which have a current injected into their bases via resistors R3 and R4 respectively. The current is derived from the potential drop across the two resistors R1 and R2 caused by the flow of charging current from the charging supply circuit connected to terminals t1, t2 to the charging control circuit and battery unit 107. During charging the two transistors R3 and R4 are "switched on" by the aforementioned base current. The collectors of the transistors TR3 and TR4 are coupled to the bases of two further transistors TR1 and TR2 which have, as their common load, relay A/2. Since the two transistors TR1 and TR2 are "switched off" the relay A/2 is de-energised.

Referring now to the sequence of operation which takes place in the use of this system as shown in FIG. 1, an operator situated in the hazardous area at the operational telephone unit 100 and desiring to make an outgoing call, firstly lifts the handset, e.g. incorporating microphone 111 and earpiece 108, and so operates the handset cradle switch S4 which in turn operates a transistor switching circuit incorporated in a reset delay circuit 110. This changes over contacts S4 and operates the relay KR/2 which in turn produces opening of normally closed relay contacts KR1 and changes over relay contacts KR2 to close the movable contact of the latter with respect to the lower fixed contact.

The opening of KR2 with respect to the upper fixed contacts cuts off charging current from the charging control circuit to the battery in unit 107. This current will previously have been flowing in a circuit starting at terminal t2 continuing through secondary winding L2, the upper fixed contact of relay contact AC4, the fuse 103, resistor R1, conductor 101, terminal t5, unit 107, the upper fixed contact of relay contact KR2, terminal t6, conductor 102, resistor R2, fuse 104, the lower contact of relay contact AC1, and terminal t1. This interruption of the current forms the initial stage of a continuing downward modulation thereof to establish a call signal in the form of outgoing dialing pulses.

When this current is interrupted the voltage drop across resistors R1 and R2 no longer exists and relay A/2 will energise. Energisation of relay A/2 changes relay contacts A1 in the primary circuit of transformer 99 from the lower fixed contact to the upper fixed contact, and consequently a DC loop is established from exchange installation through conductor 93, winding L3, resistor R5, winding L4 and conductor 94. As dialling proceeds the current pulses fed along conductors 101, 102 produce operation and release of relay A/2. The first operation of relay A/2 will operate relay CD/3 by discharging the fully charged 100 micro farad capacitor C4 through diode D3, contacts CD3, diodes D4, D6 and contacts A2 closed at this time to the lefthand contact. Charging current for capacitor C4 is derived from a 24 volt DC supply circuit connected to terminals t7, t8. Relay CD on energising, changes contact CD3 over. When relay A/2 releases, a charging path for C4 is established through D4, relay coil CD/3, D5, C4 and contacts A2. The charging circuit maintains CD/3 in the operated state. It follows then that whilst relay A/2 is being pulsed relay CD/3 will remain operated by virtue of the charge and discharge currents of capacitor C4 passing through the energising coil of the relay CD/3. At the end of dialling the relay CD/3 becomes de-energised. By this action then, relay contacts CD2 presents a 100 ohm DC loop for dialling after which the exchange takes its holding current via the transformer 99 and 400 ohm resistor R5. Across the relay contact A1, relay contacts CD1 switches in a suppressor circuit comprising of a capacitor C3 and 100 ohm resistor R7. At the operational telephone unit the dialling means is then operated in accordance with the particular number to be dialled.

Figure 3:
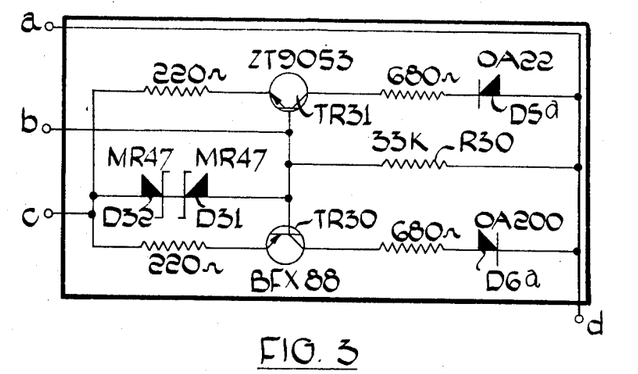
FIG. 3 is a circuit diagram of the constant current pulser unit 106.

A suitable pulser to provide outgoing call signals is shown in FIG. 3. This comprises a pair of constant current solid state switches constituted by circuits associated with an NPN transistor TR31 and a PNP transistor TR30. One only of these transistors is effectively used, the other one being biased to cut-off by action of the appropriate diode D5a, D6a in the collector load circuit. The purpose of the constant current pulser circuit is to provide an output which is insensitive to differences in line resistance and also to enable the incoming load presented by connection of the conductors 101, 102 to be reversible (the conductor 101 may be either positive or negative with respect to 102 and the system will still function correctly).

In the circuit as shown in FIG. 3 terminal a is negative with respect to terminal c. In this case the transistor TR30 will be the transistor used. In its normal state no current will be taken by the circuit of transistor TR30 until the receiver is lifted and the dial train contact switch S2 closes. This will cause current to flow in the resistor R30 and the zener diodes D31 and D32. In this case the zener diode D31 will be forward biased and so will act as any ordinary silicon diode, whilst the other diode D32 acts as a zener diode giving a stabilised voltage on the bases of the transistors when the dial pulse contacts S1 open. Until these contacts open the transistor TR30 is held switched off. When the dial pulse contacts S1 are closed and opened rapidly (as occurs when dialling a number) then the transistor TR30 is switched on and off responding to operation of the dial pulse contacts S1. During the pulse time a constant current will flow in the collector circuit of transistor TR30 due to the action of the zener diode D31 on the base circuit. This, therefore, establishes the generation of pulses of relatively constant current despite varying transmission line conditions. This current is drawn from the 24 volt power supply at terminals t1, t2 (FIG. 1) from the charging circuit and cannot exceed the original and intrinsically safe value already referred to. Consequently, the pulses represent a downward modulation of the charging current.

If the polarity of the conductors 101, 102 is reversed, i.e. terminal c is then negative relative to a, then the other transistor TR31 becomes operative in the manner described above for transistor TR30, with the two zener diodes D31 and D32 changing functions.

The intermittent current, of which the peak values are intrinsically safe, produces a corresponding intermittent voltage change across resistor R1 and R2 and relay A/2, which is a high speed relay, responds to these voltage changes thus alternately becoming energised and de-energised according to whether the intrinsically safe current is cut-off or is established in the circuit.

Relay contact A1 moves between its upper and lower fixed contacts in a corresponding manner, and impulses equivalent to those produced by operation of the dialling means of the conventional surface telephone are fed along conductors 93 and 94 to the exchange installation which responds thereto in a conventional manner. Connection for speech purposes is thereby established between the operational telephone unit 100 and a particular surface telephone responding to the number dialled.

To transmit outgoing speech press switch S3 on the handset is operated, the output of "microphone" being amplified on amplifier 112 and fed to conductors 101, 102. Such output is transmitted through transformer 99 to conductors 93, 94 and hence through the exchange installation to the called surface telephone unit.

For incoming calls, a call signal in the form of a ringing signal (conventionally consisting of bursts or pulses of alternating current) will be fed from the exchange installation along conductor 93 through movable contact of relay A1 onto the lower fixed contact, and through capacitor C2 to the energising winding of relay AC/4.

This will be energised during a continuance of each pulse or burst of alternating current, and de-energised in the intervening period.

Relay contacts AC1 and AC4 will be operated in a corresponding manner thereby connecting the ringing tone generator 105 with the AC loop established through conductors 101 and 102 to the amplifier 112. Relay contact AC2 will close to provide power to the generator 105. Accordingly, signals from the generator 105 will be developed audibly at the loudspeaker 114 subject to the press switch S3 being unoperated (open).

If incoming speech is required to be broadcast switch S3 must be released to render the amplifier operative in relation to the loudspeaker 114. For telephone conversation using only the handset to take place the press switch S3 is held continuously and the incoming speech signals are fed through earpiece amplifier 109 to the earpiece 108 at which they are audible.

Figure 4:
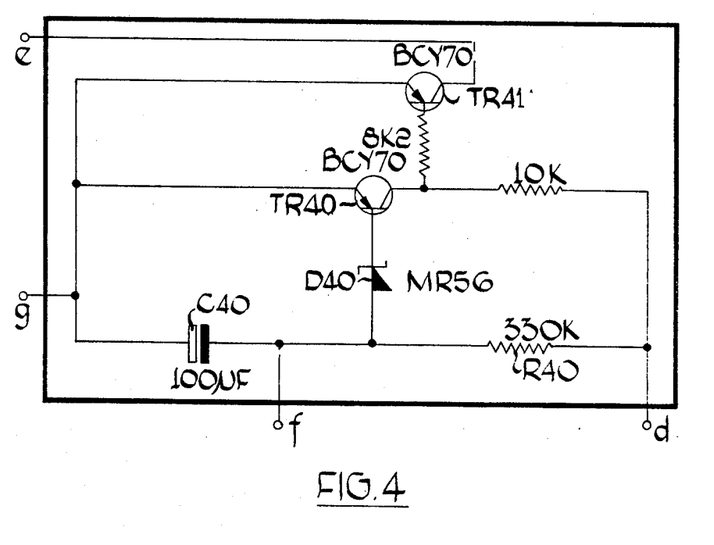
FIG. 4 is a circuit diagram of the reset delay 110.

The operational telephone unit 100 includes a reset delay circuit 110 operable after a predetermined time to de-energise the relay KR/2 operated in response to closure of handset cradle switch S4. This ensures that charging current to the battery will be reinstated after ellapse of said predetermined time should the handset cradle switch S4 be left in the operated condition for a long period without a conversation taking place, as, for example, if the handset is not returned to the cradle after a call. A suitable circuit for use is the reset delay circuit as shown in FIG. 4. In its quiescent condition, i.e. when there are no incoming or outgoing calls and charging current is being supplied from terminals t1, t2 to unit 107, the normally closed contacts of the handset cradle switch S4 hold a capacitor C40 in a fully discharged state. On lifting the receiver, thus operating the handset cradle switch S4, the zero volt rail 102a (isolated for DC from t6 by capacitors C5, C6) is connected to the delay circuit 110 and the short circuit across capacitor C40 is removed. The capacitor C40 then begins to charge from zero volts towards the negative rail via the resistor R40. Initially on operating the handset cradle switch S4, the base of the first transistor TR40 is at zero volts, thus cutting it off. This drives the following stage transistor TR41 into conduction and operates the relay KR/2. The battery charging circuit is broken by operation of the contacts KR2 as previously described. As the capacitor C40 charges up a level is reached that will overcome the voltage (normally 5.6 volts) of the zener diode D40, and applies current to the base of the transistor TR40 to switch this stage on, and in doing so switching the following stage of transistor TR41 off, thus releasing the relay KR/2.

This action will take place only if the capacitor C40 is allowed to charge up to the required voltage level. During a conversation the condition of the unit 100 prevents the capacitor so charging, a discharge path being provided by the relay contacts PR2 of relay PR/3 across the capacitor C40. The relay PR/3 is operated when the press switch S3 is closed.

Figure 5:
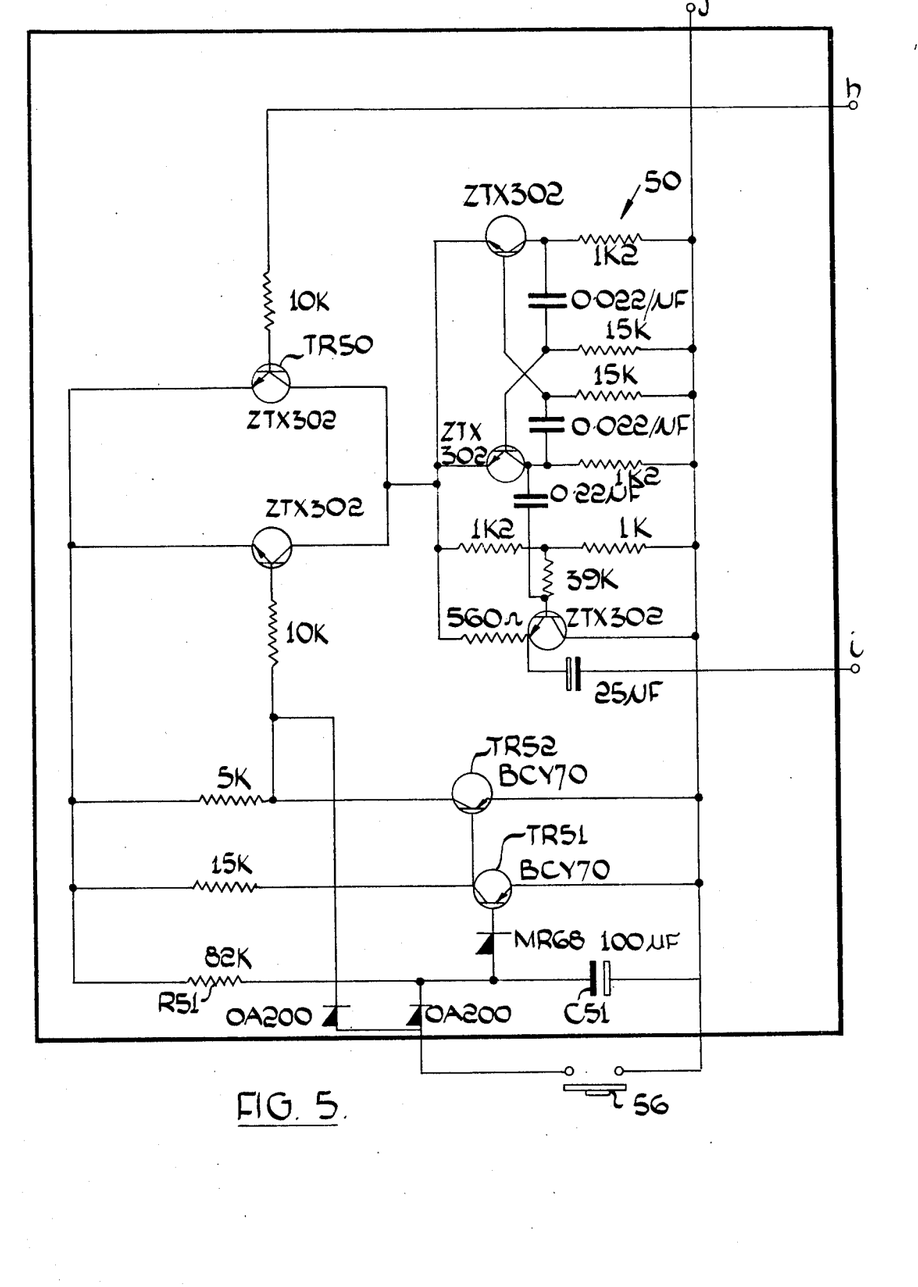
FIG. 5 is a circuit diagram of the emergency and party line tone generator 115.

It is possible that each operational telephone such as 100 may be one of several such units connected in a party line system in the hazardous area. It is, therefore, advantageous for each such telephone unit to have means for calling any other telephone units included in the party line system. For safety reasons it is also advantageous to provide on any of the operational telephone units, a switch for generating an emergency signal to be transmitted through the exchange in the safe area. The circuit providing these features is shown in FIG. 5.

In order to call a telephone unit on the system, a party line key switch S5 is closed. Closure of this switch connects the zero volts line 102a to the base of transistor TR50 which conducts to switch on a 3 KHz oscillator 50 generating a tone fed to the other telephone units of the party system, as long as the key switch S5 is pressed.

For emergency calls an emergency key switch S6 is operated. Capacitor C51 which is normally in a charged state having been charged via resistor R51 will then be discharged. In discharging, the transistor TR51 which was originally conducting, will be switched off and the transistor TR52 will be switched on. The switching on or conduction of the transistor TR52 switches on the 3

KHz tone generator 50 for the period ellapsing while the capacitor C51 recharges through the 82 k ohm resistor R51 and reaches a charge level at which the first transistor TR51 again is switched on. As a safety feature, the key switch S6 is wired so that if this delay circuit fails, an emergency tone will be sounded by keeping the emergency key switch S6 pressed, i.e. operated. The continuous 3 KHz signal may be fed at the surface to an emergency board incorporating a loudspeaker and the circuit of this board may include latching means for holding an alarm sounding loudspeaker circuit continuously operative.

Another feature of the operational telephone circuit is a transistor switch 113 designed to keep the amplifier 112 switched off until it is required for use. The circuit is best described by reference to FIG. 6. The switch comprises three transistors, the first transistor TR60 is normally conducting, while the battery is charging, by current being fed into its base via diode D61, a 5.6 volt zener diode D60 and resistor R60. Due to the fact that the transistor T60 is normally conducting, the second and third transistors TR61 and TR62 respectively are normally switched off. The third transistor TR62 is in series with the negative supply line from the battery unit 107 to the amplifier 112. When the charging current is broken, in consequence of use of the telephone, transistor TR60 will switch off because the voltage is removed from the junction of the zener diode D60 and the diode D61. When transistor TR60 is switched off, transistors TR61 and TR62 become switched on thereby energising the amplifier 112.

Figure 6:
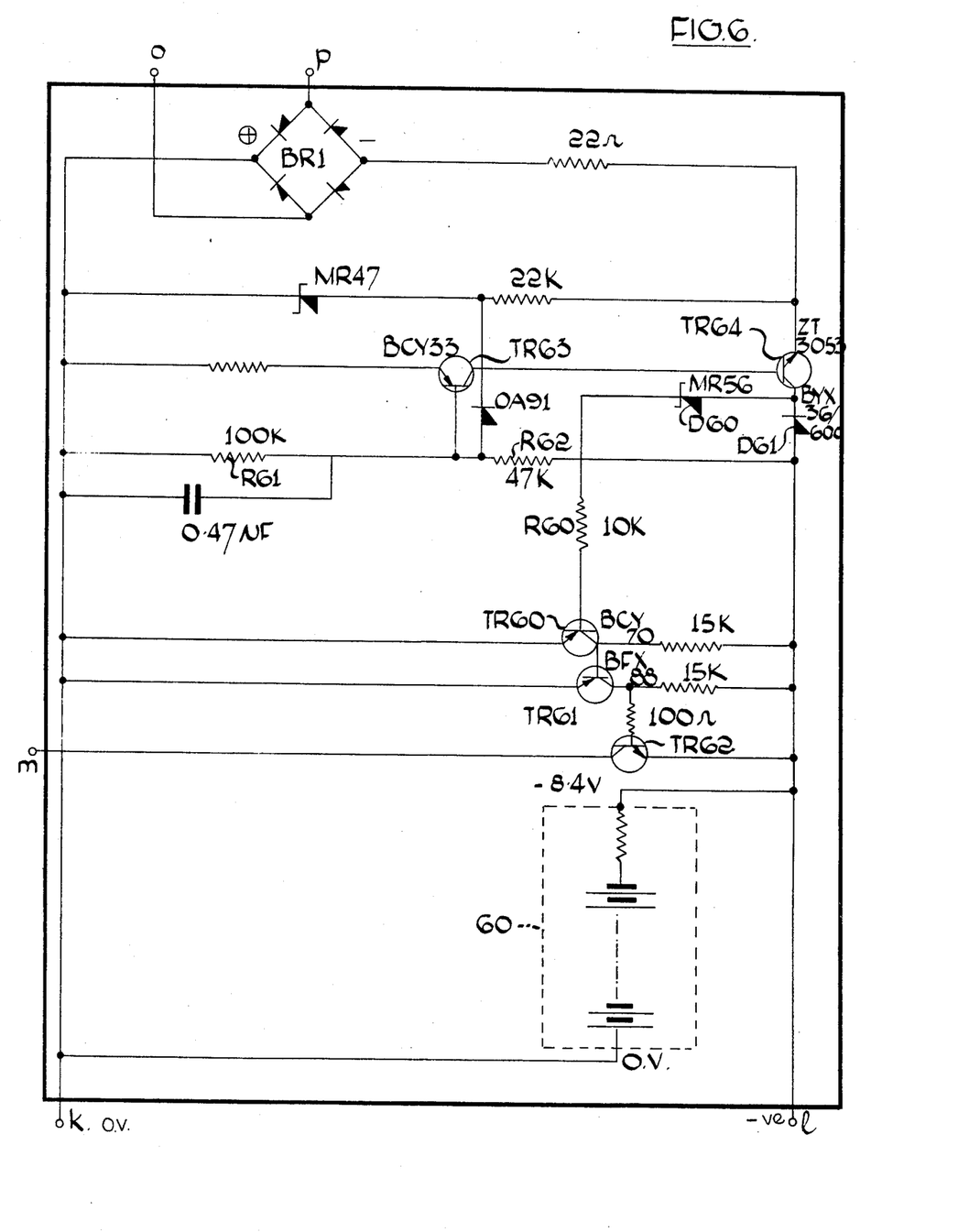
FIG. 6 is a circuit diagram of the amplifier switch unit 113 and battery and charging control circuit 107.

Thus the amplifier 112 takes no quiescent current and hence the charging current requirements for the batteries incorporated in the operational telephone units 100 are reduced compared with those that would obtain if quiescent current was drawn. This allows the telephone units to be sited at greater distances from the safe coupler device 99.

The system of FIG. 2 provides for transmission of calling signals by way of interrupted DC current, and electrical signals for conveying speech along a single pair of conductors incorporated in the transmission line 19 shown in FIG. 1.

Also illustrated in FIG. 6 is the constant current charging control circuit. The operational telephone units 100 may be placed at different distances from the safe coupler 99. Therefore, the length, and hence the resistance of transmission lines 101, 102, will differ for separate operational telephone units. To allow for this, the charging circuit is designed to draw a relatively constant current independently of the line resistance.

The battery 60 is used to supply a reference voltage across a potential divider consisting of resistors R61 and R62.

The base of transistor TR63 is connected to the junction of resistors R61 and R62. Thus the base of transistor T63 is biased to a constant voltage, causing a constant limit to flow in the base-emitter circuit.

The base of transistor TR64 is connected to the emitter of transistor TR63, hence a constant limit will flow in the base-emitter circuit of transistor TR64 and, therefore, a constant limit will flow through the emitter-collector junction to the battery 60.

The transmission line 18 may be a simple twin conductor cable. It will be appreciated that since the coal face 10 is continuously advancing, it is necessary from time to time to change the location of the operational telephone unit 100 and 100a and 100b if provided. Consequently the utilisation of a simple twin conductor cable is both inherently economic and results in simplification should it be necessary to install a longer length of cable from time to time.

Reference herein to intrinsically safe specifications and currents is intended to include such variations as may from time to time be made therein in respect of electrical apparatus used in hazardous areas, and includes any relaxations of intrinsically safe specifications as may be authorised from time to time by any proper authority in respect of telephone systems.

As used herein, the term "downwardly modulating" means that, as a result of the modulation imposed on the charging current, the magnitude of the modulated current never exceeds that of the unmodulated charging current.

We claim:

1. A telephone system for use in effecting communication between a hazardous area and a remote station in a safe area, said telephone system comprising:
   a. an operational unit for installation in a hazardous area, said unit including:
      i. audio electrical transducer means for producing audio output from an incoming electrical signal and an outgoing electrical signal from an audio input,
      ii. amplifier means associated with the transducer means for amplifying the electrical signals passing thereto or therefrom,
      iii. a re-chargeable battery for supplying power to the amplifying means,
   b. transmission line means for conveying electrical speech signals and call signals between said operational unit and a further unit for installation at a remote station in a safe area,
   c. an electrical charging circuit arranged to supply charging current of a predetermined low value from a charging current source to the battery of said operational unit along said transmission line means,
   d. means for maintaining the charging current during times when said operational unit is out of use for speech transmission, and
   e. means for downwardly modulating the charging current to establish both incoming and outgoing call signals on the transmission line means between the operational unit and the remote station such that said call signals do not exceed said predetermined low value.

2. A telephone system according to claim 1 wherein:
   a. said audio electrical transducer means includes a loudspeaker for broadcasting audio signals in the vicinity of the operational unit,
   b. the means for modulating the charging current to produce call signals includes means for establishing incoming call signals to said operational unit from said further unit, said means for establishing incoming call signals comprising:
      i. tone generator means for generating a modulated signal of an audible frequency,
      ii. switching means, said switching means selectively connecting said tone generator means or said charging current source to said transmission line means so as to selectively establish flow of said charging current or flow of said modulated signal of audible frequency along said transmission line means, said switching means establishing a flow of said incoming call signals when said switch means applies said modulated signal of audible frequency to said transmission line means, c. said operational unit includes means connecting said loudspeaker to said transmission line means to cause said signal to be broadcast.

3. A telephone system according to claim 2 wherein said transmission line means includes conductors, forming, in combination with said operational unit, a normally closed circuit through which incoming alterating electrical signals can be applied to said amplifier means for broadcasting by said loudspeaker means.

4. A telephone system according to claim 1 wherein said means for modulating the charging current to establish call signals includes means for establishing outgoing call signals from said operational unit to said further unit, said means for establishing outgoing call signals comprising dialing means for interrupting said current of predetermined low value to produce a series of pulses of said current.

5. A telephone system according to claim 4 wherein means are provided in said further unit for converting said series of pulses into a call signal current suitable for operating a conventional external exchange.

6. A telephone system according to claim 5 wherein said conversion means comprises a detector means connected to the transmission line means at the end of the latter terminating at said remote station, said detector means having detector contacts and means for operating said contacts from one position to another position in response respectively to the current established and current interrupted conditions in said transmission line means.

7. A telephone system according to claim 1 wherein said further unit comprises a transformer coupling device having a primary winding connected to an external exchange and a secondary winding connected to conductors of said transmission line means.

8. A system according to claim 7 wherein said further unit further comprises detector means connected to the secondary winding and having detector contacts, and means for operating said detector contacts from one position to another position in response to the current established and current interrupted conditions in said transmission line means, said detector contacts being connected to the primary winding in a manner such as alternatively to complete or interrupt a D.C. loop through the external exchange.

9. A telephone system according to claim 1 wherein the means for downwardly modulating said current of predetermined low value comprises:

a. in said operational unit, switch means and operating means therefor to establish open and closed conditions providing for dialing pulse generation, b. in said further unit, switch means for selectively connecting said transmission line means to a tone generator or to said charging current source.

10. A telephone system according to claim 9 including means for re-establishing application of said charging current to said battery in response to said current remaining cut off for a predetermined period after effective use of the operational unit concerned has ceased.

11. A telephone system according to claim 10 wherein futher switch means are provided in said operational unit and which are movable from a normal unoperated position to an operated position to establish speech communication from said operational unit through the transmission line means to the futher unit, and the means for re-establishing the charging current comprises a time delay circuit providing an output to re-establish the charging current in response to continuance of the further switch means in its operated position for a predetermined time after speech signals have ceased.

12. A telephone system according to claim 1 wherein said amplifier means includes means for preventing the amplifier means drawing current from the battery until the system responds to a call signal.

13. A telephone system according to claim 1 wherein said operational unit includes amplifier switching means for automatically switching on the amplifier means of said unit when the latter is brought into use and automatically switching off said amplifier means after use has ceased.

14. A telephone system according to claim 1 wherein said operational unit includes means for sending an emergency signal to said remote station by way of said transmission line.

* * * * *